(12) United States Patent
Bilder et al.

(10) Patent No.: US 7,715,544 B1
(45) Date of Patent: May 11, 2010

(54) METHOD AND APPARATUS FOR SELECTIVE CALL WAITING TREATMENT

(75) Inventors: Mitchell Bilder, Manalapan, NJ (US); Paul Fellingham, Holmdel, NJ (US); John Harlow, Middletown, NJ (US); Robert Sayko, Colts Neck, NJ (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 1238 days.

(21) Appl. No.: 11/232,398

(22) Filed: Sep. 21, 2005

Related U.S. Application Data

(60) Provisional application No. 60/614,681, filed on Sep. 30, 2004.

(51) Int. Cl.
*H04M 3/42* (2006.01)
(52) U.S. Cl. .............................. 379/215.01; 379/210.02
(58) Field of Classification Search ............. 379/210.02
See application file for complete search history.

(56) References Cited

U.S. PATENT DOCUMENTS

| | | | |
|---|---|---|---|
| 4,310,727 A | 6/1987 | Curtin | |
| 6,104,800 A | 8/2000 | Benson | |
| 6,343,121 B1 | 1/2002 | Infosino | |
| 6,633,634 B1 | 10/2003 | Crockett et al. | |
| 6,633,635 B2 | 10/2003 | Kung et al. | |
| 6,687,338 B2 | 2/2004 | Seligmann | |
| 6,813,347 B2 | 11/2004 | Baals et al. | |
| 6,842,448 B1 | 1/2005 | Norris et al. | |
| 7,418,091 B1 * | 8/2008 | Sylvain | 379/215.01 |
| 2002/0141559 A1 * | 10/2002 | Gurgun | 379/215.01 |

* cited by examiner

Primary Examiner—Rasha S Al Aubaidi
(74) Attorney, Agent, or Firm—Cantor Colburn LLP

(57) ABSTRACT

Processes for providing a selective call waiting feature within a communications network entail accepting options for a selective call waiting feature into a database and, then, linking the options to at least one account. The selective call waiting feature can be activated. The processes continue by linking the activated selective call waiting feature to operation of the communication network to implement each network end users' options. The activated selective call waiting feature is then applied to incoming calls.

15 Claims, 2 Drawing Sheets

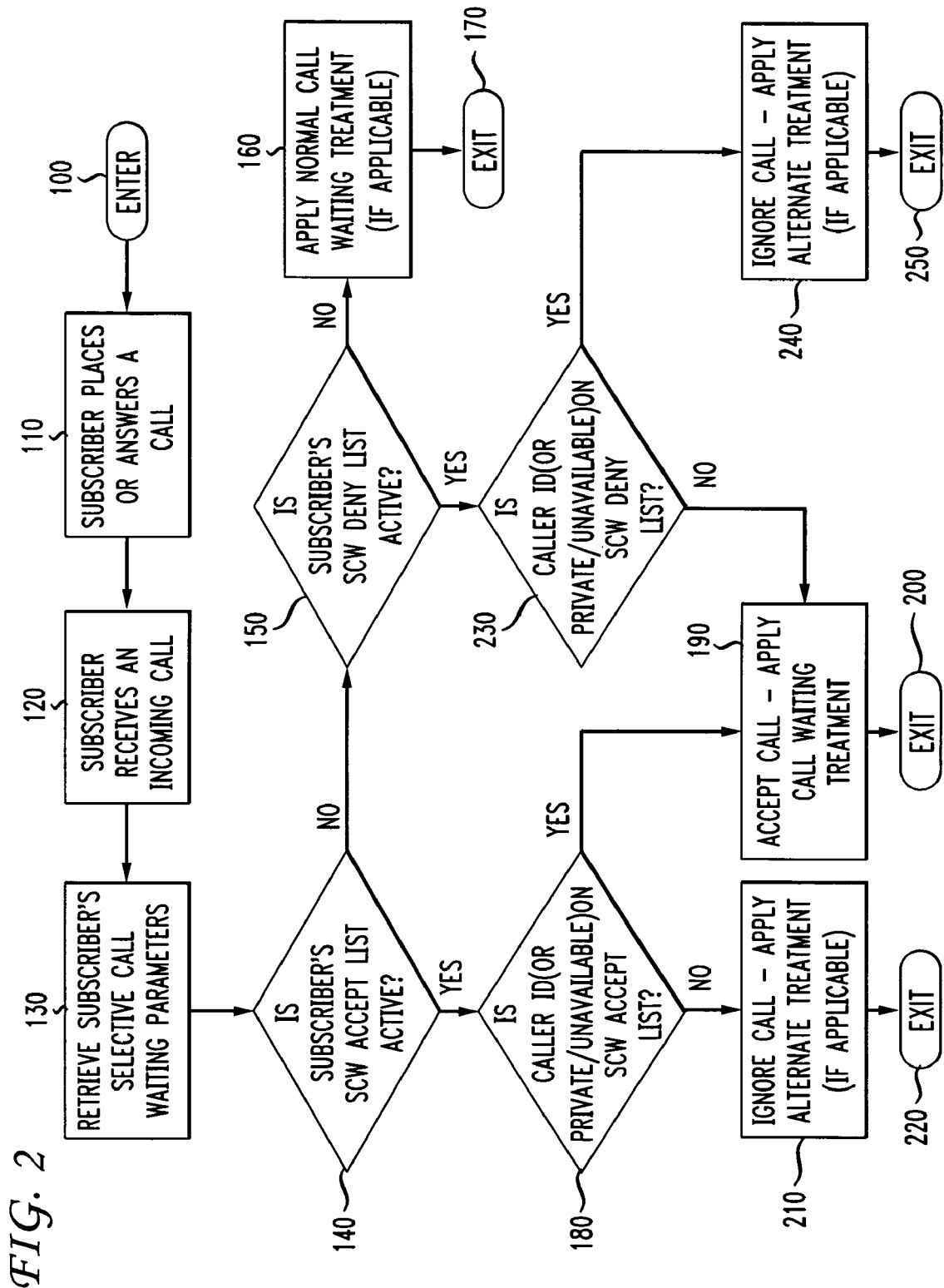

METHOD AND APPARATUS FOR SELECTIVE CALL WAITING TREATMENT

CROSS REFERENCE TO RELATED APPLICATIONS

The present application claims priority to co-pending U.S. Provisional Patent Application Ser. No. 60/614,681, filed on Sep. 30, 2004.

FIELD

The present embodiments relate to the call waiting and the ability to automatically not use call waiting based on the characteristics of the incoming call.

BACKGROUND

In today's telephone networks, local calling features include the capability to be notified of a new incoming call when a subscriber is already involved on an existing call. This "call waiting" notification is typically in the form of a special call waiting tone, played to the subscriber and masked with silence to the other party on the existing call.

The subscriber then has the option of placing the existing call "on hold" to converse with the new callers, or ignore the new call. If ignored, the new call will receive "ring-no answer" (RNA) treatment or, alternatively, be redirected to a voice mailbox (if the subscriber has this feature). Although the subscriber may have the capability to view the new caller's ID and choose not to answer the call, the call waiting tone itself can be disruptive to the call in progress. The limitations of the current feature set are most obvious in the case where the subscriber does not have voice mail because if the subscriber does not answer the new call in this situation, the new caller will hear RNA indefinitely. This continuous ringing can give the caller the impression that the caller is not home, when in fact he/she may actually be on another call.

A need exists for a call waiting system that prevents the interruption of the current call based on the characteristics of the new call. A need also exists for a call waiting system that prevents a new call from an indefinite RNA.

The present embodiments meet these needs.

SUMMARY

An embodiment of the process can be for providing a selective call waiting feature within a communications network. The process comprises first accepting options for a selective call waiting feature into a database and, then, linking the options to at least one account. The selective call waiting feature is then activated. The process continues by linking the activated selective call waiting feature to operation of the communication network to implement each network end users' options. The activated selective call waiting feature is then applied to incoming calls.

In an embodiment, an option can be a network end user does not desire the selective call waiting feature or the network end user does desire the selective call waiting feature.

The selective call waiting feature can be chosen from a call accept list, a call deny list, anonymous call acceptance, anonymous call rejection, instruction to transmit a caller ID for an incoming call, instruction to withhold a caller ID for an incoming call, selecting treatment of an incoming call rejected using an option, and combinations thereof.

BRIEF DESCRIPTION OF THE DRAWINGS

The detailed description will be better understood in conjunction with the accompanying drawings as follows:

FIG. 2 shows the call flow for an embodiment of a process for providing a selective call waiting feature within a communications network.

Figure 1:
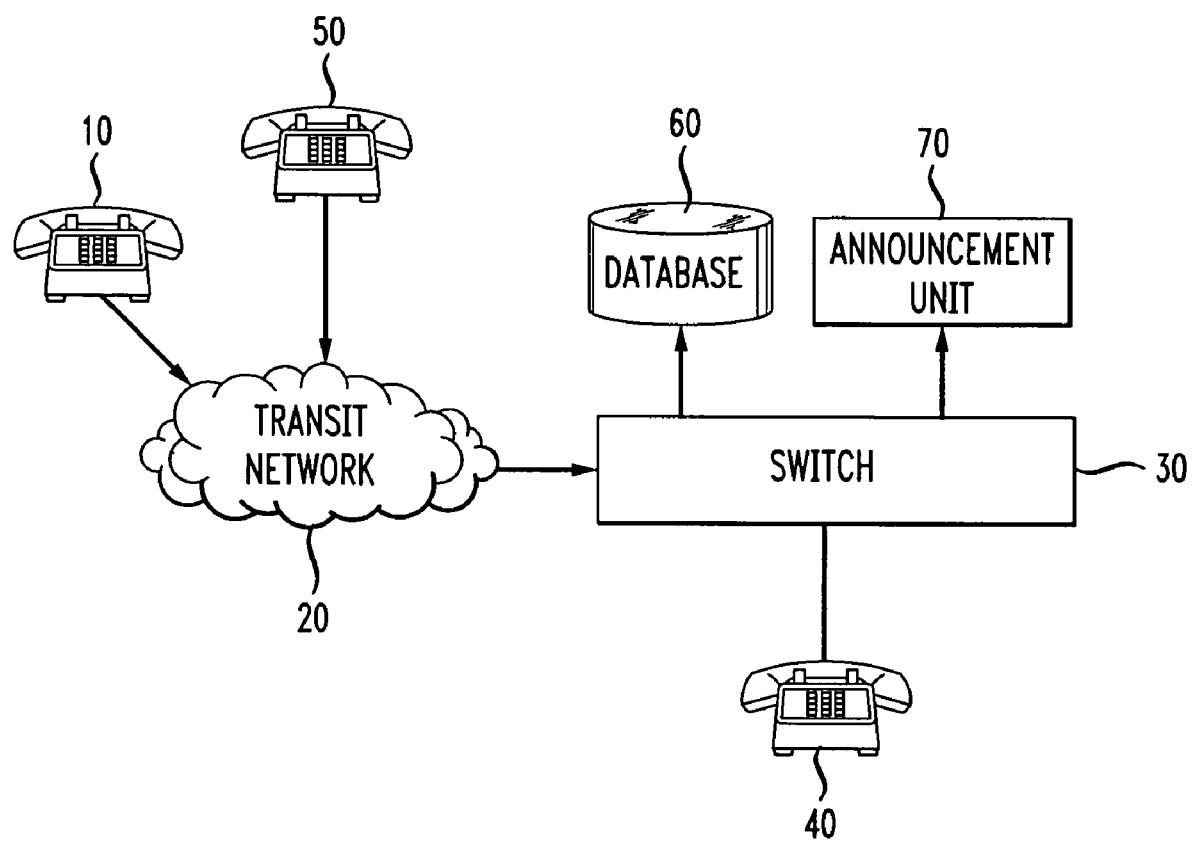
FIG. 1 shows an exemplary network diagram for an embodiment of a process for providing a selective call waiting feature within a communications network.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Call waiting has become a common feature of a telephone network. Users, however, are annoyed by incoming calls that interrupt a current call when the incoming call is not important. Selective call waiting can block new incoming calls from interrupting the current call based on characteristics of the new call.

The embodied processes for providing a selective call waiting feature within a communications network. Examples of communications networks on which the process can be used include circuit switched networks, voice over IP networks, wireless networks, others networks that provide two way communication, and combinations thereof. Examples of two way communications include email, instant messaging, text messaging service, and combinations thereof. The circuit switched network can be a traditional telephone network.

The embodied processes can entail accepting options for a selective call waiting feature into a database. The database can be installed on a server of an interne service provider, a distributed network of servers, a remote communications network or the database can be installed integrated within a traditional telephone network. The selective call waiting feature can be selected or chosen in a variety of ways. For example, the selective call waiting feature can be selected from a call accept list, a call deny list, anonymous call acceptance, anonymous call rejection, instruction to transmit a caller ID for an incoming call, instruction to withhold a caller ID for an incoming call, selecting treatment of an incoming call rejected using an option, and combinations thereof.

The options are linked to one or more accounts. The account can include an identifier. Examples of identifiers include a fully qualified domain names, telephone numbers, customer accounts, customer account number, instant message identifiers, email identifiers, or similar codes that permit a network to identify a user. One example of an option entails a network end user specifying that the selective call waiting feature is desired or not desired.

The selective call waiting feature is activated to operate on the communication network. Once activated, the selective call waiting feature implements each network end users' options. The activated selective call waiting feature is applied to incoming calls. The selective call waiting feature can be applied on a call by call basis.

Applying the feature can entail canceling a tone actuation option for calls on a call deny list. Applying a call accept list can entail using one or more identities. For example, the calling party's identity can be a fully qualified domain name, a telephone number, a customer account, a instant message identifier, an email identifier; a similar code that permits a network to identify a user, or combinations thereof.

The process can further comprise the step of applying selective treatment to an incoming call rejected using an option after the incoming call is rejected. For example if the caller continues to call back after their call has been rejected by the selective call waiting feature, the selective call waiting feature can perceive that call as a possible emergency and allow the call to be accepted. Examples of treatments for an incoming call rejected include playing an announcement, applying busy treatment, applying ring no answer, forwarding to voice mail or combinations thereof. The announcement can be a network end user recorded announcement, pre-recorded announcement, music, a tone or combinations thereof.

The application of the selective call waiting feature on an incoming call can comprise determining if the called party has the selective call waiting feature active, retrieving a called party's options, determining if a called party's call accept list is active, determining if a calling party's identity matches an entry on the call accept list, and accepting the incoming call if a match to the call accept list occurs and applying call waiting treatment.

Alternatively, the application of the selective call waiting feature on an incoming call can comprise determining if the called party has the selective call waiting feature active, retrieving a called party's options, determining if a called party's call deny list is active, determining if a calling party's identity matches an entry on the call deny list, and rejecting the incoming call if a match to the call deny list occurs.

In another alternative, the application of the selective call waiting feature on an incoming call comprises determining if the called party has the selective call waiting feature active, retrieving a called party's options, determining if a called party's call deny list is active, determining if a called party's identity matches an entry on the call deny list and accepting the incoming call if no match to the call deny list occurs. If a calling party's identity is undeterminable, the call can be accepted if the call acceptance option has been selected for an anonymous call. If calling party's identity is undeterminable, the call can be denied if the call rejection option has been selected for an anonymous call. If neither list is active, normal call waiting treatment can be applied.

The present embodiments afford the subscriber a greater measure of control over incoming calls, specifically those that arrive while the subscriber is already on another call. The traditional call waiting feature is typically either on or off, with no subscriber-selectivity as to who may attempt to interrupt them via call waiting. As a result of this lack of selectivity, subscribers are either discontented with the service or may decide to disable call waiting completely.

With reference to the figures, FIG. 1 shows an exemplary network diagram for an implementation of the present embodiments. A caller/callee (10) is engaged in a conversation with the subscriber (40), connected via a transit network (20), which may be the Public Switched Telephone Network or some other network, such as an IP network, and the subscriber's local switch (30). Another caller (50) dials the telephone number of the subscriber (40), resulting in a call being placed to the subscriber's local switch (30). The local switch can access the associated database of subscribers (60) to determine the treatment to apply to the call, and use an associated announcement unit (70) as needed.

In one embodiment, the present embodiments provide "call waiting selective call acceptance", in which the subscriber specifies a list of calling party numbers that are permitted to trigger the subscriber's call waiting feature. While on an existing call, incoming calls from any of the telephone numbers on this list can result in the subscriber being alerted with a call waiting tone, whereas all other incoming calls can be provided with alternate treatment (such as redirection to voice mail) as specified by the subscriber. In this embodiment, calls that do not provide calling line identity (Caller ID) are considered unacceptable and are provided with the alternate treatment.

In a second embodiment, the present embodiments provide "call waiting selective call rejection", in which the subscriber specifies a list of calling party numbers that are prohibited from triggering the subscriber's call waiting feature. While on an existing call, incoming call from any of the telephone numbers on this list will be provided with alternate treatment (such as voice mail, as specified by the subscriber), whereas all other calls will activate the subscriber's call waiting feature. In this embodiment, calls that do not provide calling line identity (Caller ID) can be considered acceptable and can trigger the call waiting feature.

In a third embodiment, the present embodiments provide "call waiting anonymous call rejection", in which the subscriber specifies that only calls that provide calling line identity are permitted to trigger the subscriber's call waiting feature. While on another call, incoming calls that provide Caller ID information will trigger the subscriber's call waiting feature, whereas calls having an "anonymous" or "unavailable" caller ID will be provided alternate treatment (such as voice mail). The subscriber can be able to specify whether this treatment applies to "anonymous" calls, calls with an "unavailable" Caller ID, or both.

The aforementioned embodiments can be combined, such that the subscriber can specify the desired treatment for all incoming calls. For example, combining the second and third embodiments will result in the specified list of calling numbers being "ignored" along with all anonymous calls. The combinations can be accomplished by the use of two separate features, or by an implementation that allows an "anonymous caller" entry on the call-deny list.

The feature functionalities described herein are applicable to the developing Voice over IP networks as well as the traditional switched telephone network.

FIG. 2 shows the call an embodiment of the flow for the invention as described above. In step 110, the caller either places or receives a call. While engaged in conversation, in step 120 the subscriber receives an incoming call. In step 130, the subscriber's local switch accesses its subscriber database to retrieve the subscriber's parameters, included those for Selective Call Waiting (SCW). In steps 140 and 150, the switch determines whether the subscriber is subscribed to SCW and whether the subscriber has an active "accept list" or "deny list". If the subscriber has an active "accept list", and the Caller ID (or its status as private or unavailable) is on the accept list, as determined in step 180, the call is accepted and call waiting treatment is applied in step 190. If the Caller ID (or its status) does not match an entry in the accept list, the call is ignored and alternate treatment may be applied in step 210. Alternatively, if the subscriber does not have an active accept list but does have an active deny list (step 150) and the Caller ID (or its status as private or unavailable) is NOT on the deny list, as determined in step 230, the call is accepted and call waiting treatment is applied in step 190. If the Caller ID (or its status) does not match an entry in the accept list, the call is ignored and alternate treatment may be applied in step 240. Finally, if the subscriber has no active SCW lists, normal call waiting treatment is applied in step 160, if applicable.

While these embodiments have been described with emphasis on the embodiments, it should be understood that within the scope of the appended claims, the embodiments might be practiced other than as specifically described herein.

What is claimed is:

1. A process for providing a selective call waiting feature within a communication network comprising:
    installing options for a selective call waiting feature into a database in communication with the communication network, wherein the selective call waiting feature comprises:
        a call accept list;
        a call deny list;
        anonymous call acceptance;
        anonymous call rejection;
        instruction to transmit a caller ID for an incoming call;
        instruction to withhold a caller ID for an incoming call;
        selecting treatment of an incoming call rejected using an option; and
        combinations thereof;
    linking the options to a network user's account, wherein the options comprise:
        network end user does not desire the selective call waiting feature;
        network end user does desire the selective call waiting feature; and
        activating the selective call waiting feature;
    linking the selective call waiting feature to the options in each network user's account; and
    applying the selective call waiting feature activated to incoming calls;
wherein applying the selective call waiting feature to incoming calls comprises:
    determining if a called party has the selective call waiting feature active;
    retrieving a called party's options;
    determining if a called party's call accept list is active;
    determining if a calling party's identity matches an entry on the call accept list; and;
    rejecting the incoming call if no match to the call accept list occurs or accepting the incoming call if a match to the call accept list occurs and applying call waiting treatment;
wherein applying the selective call waiting feature to incoming calls comprises:
    determining if the called party has the selective call waiting feature active;
    retrieving a called party's options;
    determining if a called party's call deny list is active;
    determining if a calling party's identity matches an entry on the call deny list; and;
    rejecting the incoming call if a match to the call deny list occurs and accepting the incoming call if no match to the call deny list occurs.

2. The process of claim 1, wherein the call accept list comprises at least one identity.

3. The process of claim 2, wherein the identity comprises a member selected from the group consisting of: a fully qualified domain name, a telephone number, a customer account, an instant message identifier, an email identifier; a similar code that permits a network to identify a user, and combinations thereof.

4. The process of claim 1, wherein applying the activated selective call waiting feature to incoming calls results in a member selected from the group consisting of:
    a playing an announcement
    applying busy treatment;
    applying ring no answer;
    forwarding to voice mail; and
    combinations thereof.

5. The process of claim 4, wherein the announcement is a network end user recorded announcement; a pre-recorded announcement; music; a tone; or combinations thereof.

6. The process of claim 1, further comprising applying the selective call waiting feature activated on a call by call basis.

7. The process of claim 1, further comprising applying selective treatment to a rejected incoming call using an option, after the incoming call is rejected.

8. The process of claim 1, wherein applying the selective call waiting feature to incoming calls comprises:
    determining if the called party has the selective call waiting feature active;
    retrieving a called party's options;
    determining if a called party's call accept list is active; and
        if a calling party's identity is undeterminable, accept the call if the call acceptance option has been selected for an anonymous call.

9. The process of claim 1, wherein applying the selective call waiting feature to incoming calls comprises:
    determining if the called party has the selective call waiting feature active;
    retrieving a called party's options;
    determining if a called party's call accept list is active, and
        if a calling party's identity is undeterminable, and deny the call if the call rejection option has been selected for an anonymous call.

10. The process of claim 9, further comprising applying selective treatment to the call rejected.

11. The process of claim 1, wherein applying of the selective call waiting feature to incoming calls comprises:
    determining if the called party has the selective call waiting feature active;
    retrieving a called party's options;
    determine if the call accept list is active; and
    determine if the call deny list is active, and if neither list is active, apply normal call waiting treatment.

12. The process of claim 1, wherein applying of the selective call waiting feature to incoming calls comprises canceling a tone actuation option for calls on the call deny list.

13. The process of claim 1, wherein the at least one account comprises an identifier selected from the group consisting of: a fully qualified domain name, a telephone number, a customer account, a instant message identifier, an email identifier; and a similar code that permits a network to identify a user.

14. The process of claim 1, wherein the database is installed on a server of an internet service provider, a distributed network of servers, at a location remote to the communications network, or combinations thereof.

15. The process of claim 1, wherein the communications network comprises a member selected from the group consisting of: a circuit switched network, a voice over IP network, a wireless network, another network that provides two way communication, and combinations thereof.

* * * * *